April 12, 1949. H. ROGERS ET AL Re. 23,098

TWO-WAY PLOW

Original Filed Jan. 1, 1944 2 Sheets-Sheet 1

INVENTORS
HARRY ROGERS
WILLIAM FISK MELLEN
BY HARRIS, KIECH, FOSTER & HARRIS
FOR THE FIRM
ATTORNEYS

TWO-WAY PLOW

Original Filed Jan. 1, 1944 2 Sheets-Sheet 2

INVENTORS
HARRY ROGERS
WILLIAM FISK MELLEN
BY HARRIS, KIECH, FOSTER & HARRIS
FOR THE FIRM
ATTORNEYS

Reissued Apr. 12, 1949

Re. 23,098

UNITED STATES PATENT OFFICE 23,098

TWO-WAY PLOW

Harry Rogers, Bakersfield, and William Fisk Mellen, Whittier, Calif.; said William Fisk Mellen assignor to Alice Martin Mellen, Whittier, Calif.

Original No. 2,424,192, dated July 15, 1947, Serial No. 516,644, January 1, 1944. Application for reissue January 31, 1949, Serial No. 73,698

17 Claims. (Cl. 97—29)

This invention relates to plows, and particularly to plows drawn by powered vehicles such as tractors, as where plows are mounted thereon so as to be movable to and from operating position.

The principal object of this invention is to provide an efficient two-way plow structure which will enable the plow mechanism to be drawn back and forth across a field in opposite directions, whereby adjacent furrows will be turned in the same direction, and whereby the plows can be easily and selectively moved to and from their operative positions.

A further object is to provide a two-way plow structure which can also be readily used as a ditching machine.

These objects are attained by employing two plowshares or plow "bottoms" mounted on the same vehicle, but pitched in opposite directions. Thus, the plow mechanism may be drawn in one direction to throw the furrow, for example, to the right. At the end of the furrow the plowshare which has just been used will be raised and the second plowshare lowered by simple, easily actuated means while the vehicle is being turned around to travel in the opposite direction. Upon return travel, said second plowshare will throw the furrow to the left, for example, with respect to the vehicle, said furrow actually being thrown in the same direction as the first furrow. Thus the vehicle may be moved back and forth across the field, working progressively from one end of the field to the other, the plowshares being switched as the end of each furrow is reached so that all furrows will be turned in the same direction. For ditching both plowshares will be lowered to operative position and properly spaced in relation to each other.

Briefly stated, the invention resides primarily in a plow construction comprising a pair of movably mounted, selectively usable plow bottoms or plowshares which are pitched in opposite directions. In one form the plowshares are so mounted and connected that as one plowshare is lowered into operative position the other plowshare is simultaneously elevated into operative position, one preferably counterbalancing the other. The invention also includes means to brace and hold the operative plowshare in its operative position, said means being adapted to be collapsed when it is desired to elevate the plowshare into its inoperative position. The invention further comprises a trip means to initiate the collapsing movement. The invention also includes an arrangement of parts whereby both plowshares may be lowered to properly spaced operative positions to turn earth in opposite directions simultaneously and form ditches.

In the accompanying drawings, wherein one embodiment of the invention is disclosed by way of illustration:

Figure 1:
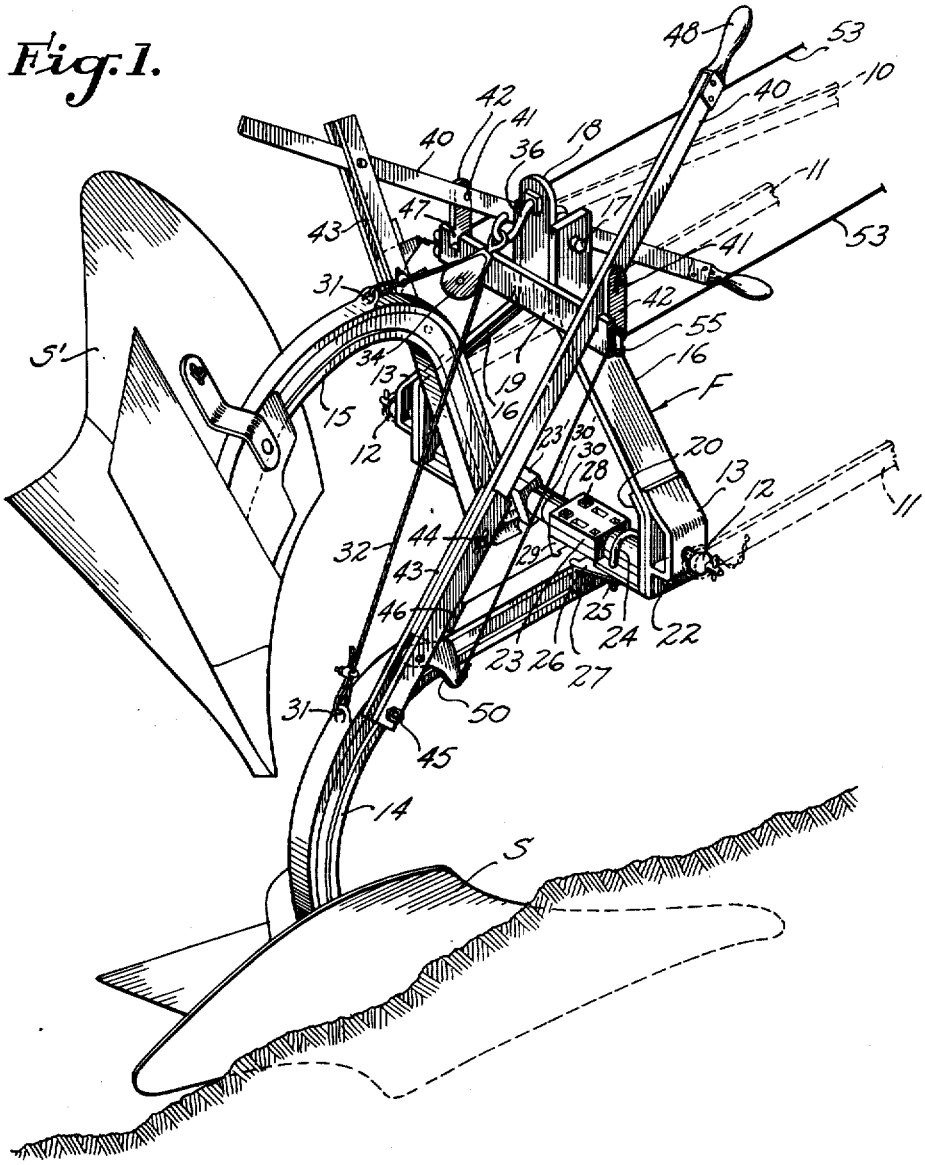
Fig. 1 is a perspective view showing the two oppositely directed plowshares of the present improvement, one of said plowshares being in operative position to turn a furrow, and the other of said plowshares being in elevated inoperative position.

In these drawings there are shown in dotted lines an upper arm 10 and lower arms 11 which represent supporting and positioning arms of a well known hydraulic control lift adapted to be attached to tractors for supporting plows and raising and lowering them from and to plowing positions. These arms 10 and 11 support and position a triangular framework generally indicated at F which may be referred to as an A-frame. The arm 10 is suitably connected to the top of said frame F and the arms 11 are respectively connected to the lower corners of said frame by means of bearings 12 secured to ears 13 at said lower corners. In the case of the mentioned hydraulically controlled lift, the frame F will be raised vertically to raise the whole plow construction from operative position, or to lower it toward operating position. However, the arms 10 and 11 may represent any conventional support for the plow structure. For example, the arms 11 may represent parts of a known power lift serving as supports for the frame F, about which the frame F pivots on the bearings 12, and the arm 10 may represent an adjustable arm adapted to be drawn toward the right of the position shown in the drawings so that the frame F may be tilted for raising the plowshares, or the arm 10 may be moved toward the left of the position shown in the drawings for the purpose of lowering the plowshares or plowing unit as a whole. The latter comprises a pair of plow bottoms or plowshares with associated mold boards which are in general indicated at S and S′ and are securely mounted in any conventional or preferred manner to the lower portions of the curved plowbeams 14 and 15 respectively.

The indicated, generally triangular, share-supporting frame F comprises principally two inclined frame members 16 bolted or otherwise bound together at their tops as indicated at 17 and carrying between them an upstanding plate 18 preferably welded in position. A cross-bar 19 is welded or otherwise fixedly secured to the upper portions of the frame members 16 and said plate 18, whereby a firm and rigid construction is provided.

Figure 3:
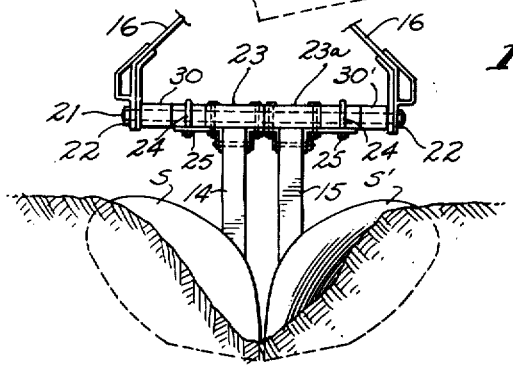
Fig. 3 is a fragmentary elevation showing the plowshares in ditching position.

The lower portions of said frame members 16, which may be suitably reinforced by welded small plates 20 as indicated, carry between them a transverse supporting shaft 21 each of whose ends is secured in the frame as by means of a nut 22 (Figs. 1 and 3). The forward ends of said plowshare supporting beams 14 and 15 are provided with appropriate bearing parts variously indicated at 23 and 23'. The parts 23 are shown as bound to the shaft 21 by means of U-bolts 24 which in turn are secured by means of nuts 25 to laterally directed brackets 26 bolted at 27 to the beams 14 and 15. The bearing parts 23 act also as spacers between the frame members 16 and the respective beams 14 and 15. Each bearing part 23' is in turn bolted at 28 to a bracket 29 carried on the opposite side of the beam 14 or 15 from the bracket 26. Thus the plowshares S and S' and their supporting beams 14 and 15 are amply journaled upon the shaft 21 to prevent twisting. Two spacing sleeves 30 and 30' are provided between the bearing parts 23' of the two supporting beams 14 and 15 in order that said beams 14 and 15 and their plowshares S and S' may be always retained in properly spaced positions.

Inasmuch as the plowshares S and S' are frequently raised and lowered, that is, at the end of each furrow, an important feature of this invention resides in counterbalancing the two plowshares S and S' against each other in order that the effort required on the part of the tractor driver or other operator to raise and lower the plows may be reduced to a minimum. In order to provide for this counterbalance, each of the arms 14 and 15 is provided with an eye 31 on the upper face of its rear curved portion, to which eyes are attached the ends of a steel wire cable or other suitable connecting means 32. This cable is run over the pulley 33 of a block or sheave 34 which is provided with a swiveled eye 35 that engages a hook 36 mounted at 37 in the upper end of the plate 18 at the top of the frame F. The length of the cable 32 is such that when one plowshare is in operative position for plowing the other plowshare is in the elevated position shown in the drawings. Thus when it is desired to reverse the positions of the plowshares S and S', it is not necessary to lift the dead weight of the lower plowshare due to the fact that it is counterbalanced by the other plowshare.

Each plowshare is both braced in operative position and adapted to be elevated into inoperative position by means of a jointed lever and brace comprising a lever 40 fulcrumed at 41 on the upper end of an ear or bracket 42 secured as by welding to the forward face of the corresponding projecting end of the cross-bar or plate 18. A shorter section 43 of said brace and lever is in the form of two spaced bars or plates pivoted at 44 to the main lever section 40 at a point adjacent one end of the latter, the opposite end of said lever section 43 being pivoted at 45 to the respective plowshare supporting beam 14 or 15. When the brace lever 40, 43, is in position to hold the plowshare in its operative position, the lowermost end of the section 40 will swing downward between the two parts of the section 43 to a position slightly beyond dead center with respect to the pivot 44, thus tending to lock the jointed lever or brace in position to hold the beam 14 or 15 depressed. In order to limit said movement beyond dead center, the intermediate portion of the lever section 43 has on its lower side a stop or cross-bar 46 connecting the two spaced members thereof. This stop 46 limits the movement of the lower end of lever section 40 to said locked position in which the lever braces the respective plowshare and beam in depressed or operative position, and the weight of said parts tends to maintain such position. For the purpose further of limiting the movement of the lever part 40 to said locked position, the adjacent part of the cross-bar 19 may be notched as indicated at 47 so that the bottom of the notch 47 will act as a stop to engage the under edge of the lever part 40. For purpose of manipulation of the lever 40, a handle 48 conveniently is provided so that it will be within reach of the tractor driver or other operator seated or positioned ahead of the plow.

By depressing the handle 48 on the upper or forward end of a lever section 40 which is retaining a plowshare in operative position, the operator will lift that plowshare which is connected therewith. However, the weights and strains may be such that it is not always easy to move the jointed lever past dead center and out of its locking and bracing position. Therefore a tripping device is provided to kick the lowermost end of the lever member 40 past dead center and initiate the lifting operation. This tripping device includes a triangular trip plate 50 pivoted at 51 between the members of the lever section 43 and having a heel 52 adapted to engage the lowermost extremity of the lever section 40 for the purpose of kicking the latter out of its dead center position by means of a jerk upon a cable 53 secured in an eye 54 on the projecting tip of said angular trip 50. The cable 53 runs between a pair of pulleys 55 conveniently disposed on the adjacent end of the cross-plate 19 at the top of the frame F, said cable 53 extending forward to a position convenient to the tractor operator or other operator. The lower one of the pair of pulleys 55 guides the cable 53 when the lever 40, 43, is in position to brace the plow beam 14 or 15 and while it is being raised through the first stages of the lifting operation. The upper of said two pulleys 55 guides the cable 53 when the plowshare is being lifted in the later stages of its lifting operation, as seen in connection with the illustration of the plowshare S' and its supporting arm 15. After the cable has been actuated to cause the trip 50 to kick the lower end of the lever arm 40 from its dead center position, the plowshare is then conveniently raised by the operator through depressing of the adjacent handle 48, this operation being comparatively simple due to the fact that the other plowshare is in counterbalancing relation and tends to assist the lifting operation. Again, either plowshare may be lifted by a continued pull on its cable 53, without use of handle 48. In order to keep the angular trip 50 in desired position at any stage, a light spring 56 is secured to the pivot pin 45 at the adjacent end of the lever section 43, the opposite end of said spring being secured to the tip of the trip 50 adjacent its pivot 51 in order that the spring will cause said trip 50 continuously to engage the end of the lever section 40 when in locked position, this spring also moving said trip 50 into position between the parts of the lever section 43 and into abutment with the cross-bar 46 when the lever is in the inoperative position as shown in connection with the elevated beam 15 (see Fig. 2). Said spring 56 is not strong enough alone to cause the lower end of the lever section 40 to be kicked out of its locked position in which it braces the plow beam in operative relation.

In operating the improvement of the present invention, the plow supporting frame F having been mounted upon the supporting arms 10 and 11, which are carried upon a tractor, or other draft vehicle, the frame F will be set in such adjusted position as required. When the arms 10 and 11 are part of a hydraulic lift carried on a tractor according to one known construction, they will be raised as a unit in order to raise the frame F vertically when it is desired to lift the plow out of the ground, and also when it is desired to travel to or from the place of work, or for other transport. Similarly, these parts will be lowered vertically to bring the plows into operative position. When the arms 10 and 11 constitute part of a power lift or other desired supporting and positioning means, the frame F may be swung upon the bearings 12 as through the medium of the arm 10 in order to raise and lower the plow structure as a unit. In preparing for plowing, the frame F will be adjusted to the desired position according to whatever means of support is employed, whereby to bring the plowshares S and S' adjacent the earth to be plowed, and to hold an operating plowshare at an even depth while plowing.

Figure 2:
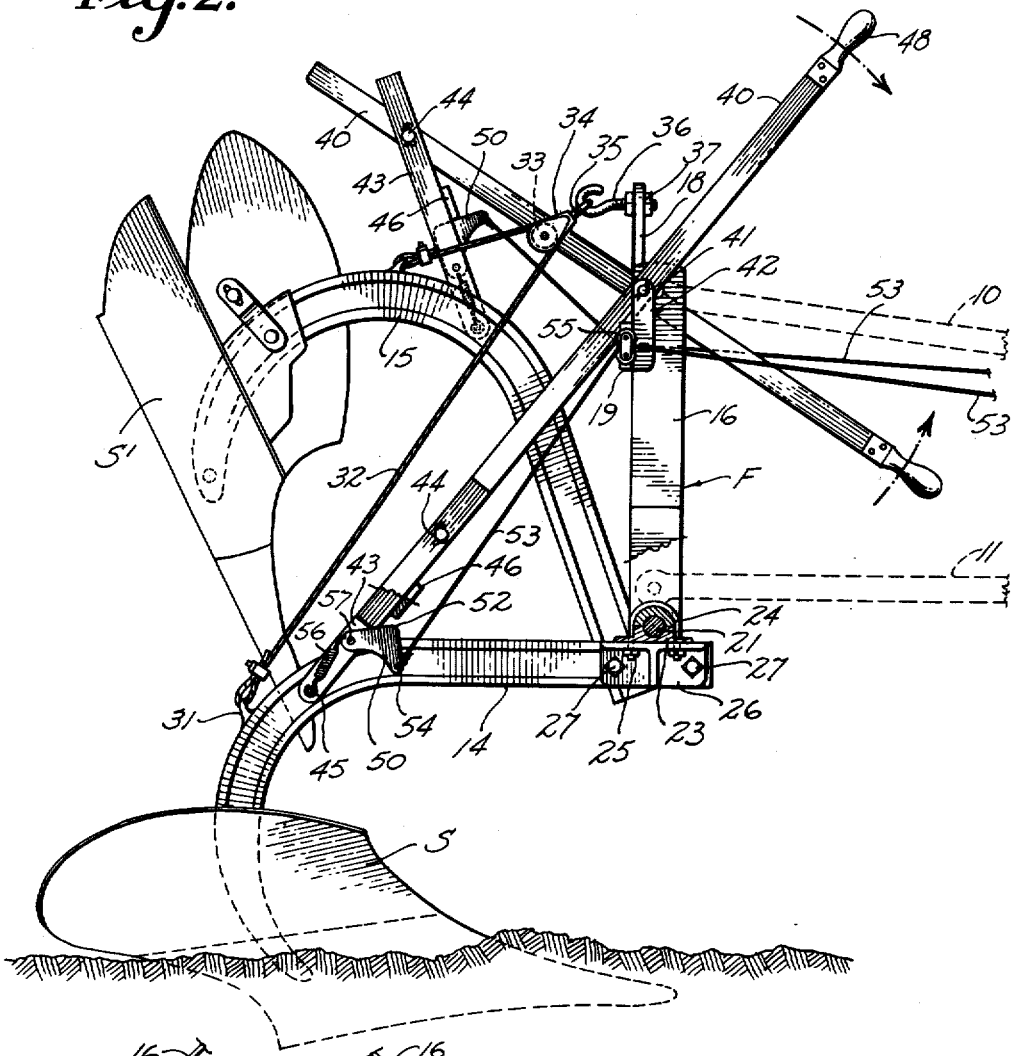
Fig. 2 is chiefly a side elevation showing the two plowshares in the position of Fig. 1, the near portion of the framework being broken away to show the mounting of the plowshares supporting beam on the supporting shaft, a portion of the lever construction also being broken away.

In order to plow, one of the handles 48 is raised by the operator, thereby depressing the corresponding plowshare S or S' into its operative position, or the other handle 48 may be depressed to shift the plowshares. As the tractor or other vehicle gets under way and the plowshare sinks into the earth, the handle 48 and its lever section 40 can be moved to the limit of upward movement, thereby straightening the jointed lever 40, 43, and moving the lower end of the member 40 past dead center into the locked position against stop 46 as shown in Figs. 1 and 2 with respect to the plowshare S carried on the supporting beam 14. When the plowshare S operates as indicated in the drawings, the furrow will be turned toward the right as the vehicle moves forward. Obviously the other plowshare S' could have been lowered so that the plowshare would operate to turn the furrow toward the left. When the edge of the field is reached and the tractor or other vehicle is turned around to move in the opposite direction, the respective cable 53 is jerked to cause the triangular trip 50 to kick out the lower end of the lever section 40 past its dead center position so that said handle 48 can be depressed in order to elevate the plowshare S by means of the beam 14. This movement is indicated by the arrow in the upper portion of Fig. 2. At the same time, the other plowshare S' and its beam 15 are being lowered. During the procedure the other handle may be simultaneously raised by the operator as indicated by the other arrow in Fig. 2, whereby the raising and lowering operation is facilitated, especially in view of the fact that the two plowshares are counterbalanced by reason of their being interconnected by the cable 32 passing over pulley 33 in the sheave block 34. The positions of the plowshares having been reversed when a return trip across the field is undertaken, the new furrow will be turned in the same direction as the previous furrow.

The construction of the present invention is readily usable for making ditches. In general this result is accomplished by lowering both of the plowshares S and S' at the same time so that they lie alongside one another. Thus, when the vehicle supporting the plow is drawn forward, one of the shares throws the earth in one direction and the other of the shares throws the earth in the opposite direction. This operation is best indicated in Fig. 3. To bring the plowshares into this position, it is possible to lower them either by lowering the frame F where a hydraulically controlled lift is employed, or tilting said frame F where a power lift or the like is employed, as previously indicated. The eye 35 of the sheave 34 may or may not be disconnected from its hook 36, depending upon the extent to which the frame F is to be moved to lower the plowshares preparatory to ditching. If the spacing sleeves 30 and 30' located between the bearings 23' on the two plow-beams 14 and 15 space the two plowshares S and S' too far apart for proper ditching, the shaft 21 may be removed by removing one of the nuts 22, and the said spacers 30, 30' placed at opposite ends of the shaft 21, after remounting the plow-beams 14 and 15 upon shaft 21, the shaft being then replaced, as shown in said Fig. 3. Slight play at the pivot connections 41 and 45 and in the notches 47 permits all lateral movement of the levers 40 that is necessary for this purpose. This places the plowshares S and S' closely adjacent each other and side by side so that drawing forward of the plow structure produces an effective ditching operation.

When the eye 35 of the sheave block 34 is disconnected, the levers 40 serve simultaneously to brace both lowered plowshares in ditching position in the same manner that the shares are individually braced for plowing as previously explained.

In addition to disconnecting the sheave block 34 from the hook 36 for purpose of lowering the plowshares to ditching position, it is also desirable to disconnect said sheave for purposes of lowering the plowshares during storage of the apparatus.

It will be understood that the specific embodiment here shown and described is given as mere illustration of the generic invention, and that it is not intended to be limiting of the invention generically claimed, protection being reserved for all modifications coming within the scope of the claims.

We claim as our invention:

1. A plowing construction comprising in combination: a support adapted for connection with a draft vehicle; a pair of plowshares mounted on said support, one of said plowshares being adapted to throw a furrow in an opposite direction from that of the other plowshare; means for selectively lowering said plowshares into operative position and raising them into inoperative position, said means including a jointed member movable past dead center to a locked position to brace a lowered plowshare in operative position.

2. A combination according to claim 1 and trip means pivotally mounted on said jointed member for positively moving said jointed member out of said dead center position and initiating lifting movement.

3. A construction according to claim 1 and trip means to move said jointed member from said dead center position in initiating lifting movement of said plowshare.

4. A plowing construction comprising in combination: a support adapted for connection with a draft vehicle; a pair of plowshares mounted on said support, one of said plowshares being adapted to throw a furrow in an opposite direction from that of the other plowshare; means for selectively lowering said plowshares into operative position and raising them into inoperative position, said means including a jointed lever movable past dead center to a locked position to brace a lowered plowshare in operative position, said jointed lever comprising a main lever bar fulcrumed in the upper portion of said support, and a bifurcated member whose remote end is pivotally connected with the plowshare and whose other end is pivotally connected with said main lever bar, the adjacent end of the main bar lying between the bifurcations; and a tripping mechanism comprising a trip plate pivoted between the bifurcations and having a heel to engage the adjacent end of the main lever bar when the latter is in locked position, whereby to move the latter from said locked position.

5. A plow structure comprising: an upstanding supporting frame adapted to be carried by a tractive vehicle; a pair of beams movable on said frame; a pair of oppositely pitched plowshares carried respectively by said beams; separate levers for selectively raising and lowering said beams and their plowshares for selectively turning furrows in opposite directions with respect to the plow structure; and mountings carried by the upper portion of said frame, said levers being fulcrumed on said mountings.

6. A structure according to claim 5 wherein the lower portion of the frame carries a transverse shaft and the plow beams are pivoted thereon.

7. A plow structure comprising: an upstanding supporting frame; a pair of beams movable on said frame; a pair of oppositely pitched plow bottoms carried respectively by said beams; separate levers fulcrumed on said supporting frame and movably connected with the respective beams for selectively raising and lowering said beams and their plow bottoms whereby furrows may be selectively turned in opposite directions with respect to the plow structure; pulley means carried by the upper portion of said frame; and a cable connected with said pulley means and respectively connected with said beams and their plow bottoms for connecting said beams and plow bottoms in counterbalanced relation whereby one plow bottom is raised as the other is lowered.

8. A plow structure according to claim 7 wherein levers are fulcrumed on the upper portion of said frame.

9. A plow structure comprising: a frame; a horizontal shaft carried in said frame; a pair of beams pivotally mounted on said shaft; a plowshare mounted on each beam, said plowshares being oppositely pitched to turn furrows in opposite directions with respect to each other; a lever connected at its lower end with each beam, each lever being fulcrumed on said frame for raising and lowering the respective beam and plowshare; means on each lever for locking the same in position to brace its beam when the respective plowshare is in operative position; a trip carried by each lever to unlock the same; a cable for each trip passing over a guide on said frame and connected with its trip for actuation thereof; and means connecting said beams and their plowshares in counterbalancing relation whereby the plowshares are simultaneously moved in opposite directions to and from their operative positions.

10. A plow structure comprising: a frame; a horizontal shaft carried on said frame; a plow-beam pivotally mounted on said shaft; a plowshare mounted on said beam; and a jointed brace connected with said frame and movable past dead center to a locked bracing position, and connected to said beam to brace the same in operative position.

11. A structure according to claim 10 including a trip operatively connected with said brace to move the latter out of bracing position, a draft connection leading to said trip to operate the same and adapted to lift the plow-beam by continued pull.

12. A plow structure comprising: a frame; a horizontal shaft carried on said frame; a plow beam mounted on said shaft; a plowshare mounted on said beam; a jointed brace connected with said frame and movable past dead center to a locked bracing position, said brace being connected with said beam to brace the latter in operating position; a trip connected with said brace to move the latter out of dead center position to non-bracing position; and means to actuate the trip.

13. A convertible plow structure comprising: a support adapted to be carried by a draft vehicle; a pair of oppositely pitched plowshares carried by said support and adapted to be moved vertically; means interconnecting said plowshares in counterbalanced relation whereby one plowshare will be lowered as the other is raised for selectively turning furrows oppositely; means whereby said interconnecting means may be rendered inoperable to counterbalance said plowshares whereby both plowshares may be simultaneously lowered into position for forming a ditch; and means for raising and lowering said plowshares.

14. A structure as in claim 13 including movable bracing means connected with said support for bracing said plowshares in their lowered ditch-forming position.

15. A plowing construction comprising in combination: a support adapted for connection with a draft vehicle; a pair of plowshares mounted on said support, one of said plowshares being adapted to throw a furrow in an opposite direction from that of the other plowshare; means for selectively lowering said plowshares into operative position and raising them into inoperative position, said means including a jointed lever movable past dead center to a locked position to brace a lowered plowshare in operative position, said jointed lever comprising a main lever member fulcrumed on the upper portion of said support, and a second lever member whose remote end is pivotally connected to the plowshare and whose other end is pivotally connected with said main lever member; and a tripping mechanism pivotally mounted on said second lever member and having a heel adapted to engage the adjacent end of the main lever member when the latter is in locked position whereby to dislodge the latter from said locked position.

16. A plow structure comprising in combination: an upstanding supporting frame having a shaft disposed transversely to the line of travel of the plow structure; a pair of beams separately mounted on said shaft and movable oppositely to one another in planes parallel to said line of travel; a pair of oppositely pitched plowshares carried respectively by said beams on the same side of said shaft; separate levers movably connected with said beams and the upper portion of said frame for selectively raising and lowering said beams and their plowshares whereby furrows may be selectively turned in opposite directions with respect to the plow structure; pulley means carried by the upper portion of said frame; and a cable connected with said pulley means and respectively connected with said beams and their plowshares for connecting said beams and plowshares in counterbalanced relation whereby one plowshare is raised as the other is lowered.

17. In combination in a plow construction: a support adapted to be bodily raised and lowered; means carrying said support and adapted to raise and lower said support bodily and also adapted to be carried upon a draft vehicle; a plowshare supporting means movably mounted upon said support to be raised and lowered; oppositely pitched plowshares carried by said movable supporting means to be selectively raised and lowered; means carried by said support and connecting said plowshares and their supporting means in counterbalancing relation, whereby when one plowshare is lowered another is raised; and separately pivoted levers pivotally connected to said supporting means for raising and lowering said counterbalancing plowshares.

HARRY ROGERS.
WILLIAM FISK MELLEN.

REFERENCES CITED

The following references are of record in the file of this patent:

UNITED STATES PATENTS

| Number | Name | Date |
|---|---|---|
| 1,194,166 | Gaines | Aug. 8, 1916 |
| 1,362,277 | Watson | Dec. 14, 1920 |
| 1,410,917 | Hee | Mar. 28, 1922 |
| 2,118,180 | Ferguson | May 24, 1938 |
| 2,187,380 | Kaltoft | Jan. 16, 1940 |
| 2,204,487 | Glorfield | June 11, 1940 |
| 2,332,741 | Mott | Oct. 26, 1943 |
| 2,364,367 | Janke | Dec. 5, 1944 |

FOREIGN PATENTS

| Number | Country | Date |
|---|---|---|
| 163,961 | Great Britain | June 2, 1921 |
| 544,041 | Great Britain | Mar. 25, 1942 |

Certificate of Correction

Reissue No. 23,098. April 12, 1949.

HARRY ROGERS ET AL.

It is hereby certified that the name of the assignee in the above numbered patent was erroneously described and specified as "Alice Martin Mellen" whereas said name should have been described and specified as *Alice Marian Mellen* as shown by the record of assignments in this Office; and that the said Letters Patent should be read with this correction therein that the same may conform to the record of the case in the Patent Office.

Signed and sealed this 4th day of October, A. D. 1949.

[SEAL]

THOMAS F. MURPHY,
*Assistant Commissioner of Patents.*